United States Patent

[11] 3,572,015

[72] Inventor Alfred Brunner
 Winterthur, Switzerland
[21] Appl. No. 731,419
[22] Filed May 23, 1968
[45] Patented Mar. 23, 1971
[73] Assignee Sulzer Brothers, Ltd.
 Winterthur, Switzerland
[32] Priority May 31, 1967
[33] Switzerland
[31] 7697/67

[54] WATER SEPARATOR FOR SATURATED-STEAM GENERATORS
 7 Claims, 4 Drawing Figs.
[52] U.S. Cl. .................................................. 55/347,
 55/348, 55/457, 122/34
[51] Int. Cl. ...................................................... B01d 45/12
[50] Field of Search............................................. 122/34,
 488, 491; 55/345, 346, 347, 348, 457

[56] References Cited
UNITED STATES PATENTS

| | | | |
|---|---|---|---|
| 3,066,088 | 11/1962 | Blaser............................ | 122/491X |
| 3,061,994 | 11/1962 | Mylting........................ | 55/346 |
| 3,086,343 | 4/1963 | Stern............................. | 55/346X |
| 3,329,130 | 7/1967 | Cochran........................ | 55/337X |

Primary Examiner—Kenneth W. Sprague
Attorney—Kenyon and Kenyon

ABSTRACT: The tube sections containing the twist-producing elements are each surrounded by a jacket which has an internal diameter at least 1.5 times that of the internal diameter of the tube section and extends at least a distance equal to the internal diameter of the tube section above the tube section to receive the water separated from the steam. Outlets are provided at the base of the jackets to allow the water to run off out of the path of the dried steam.

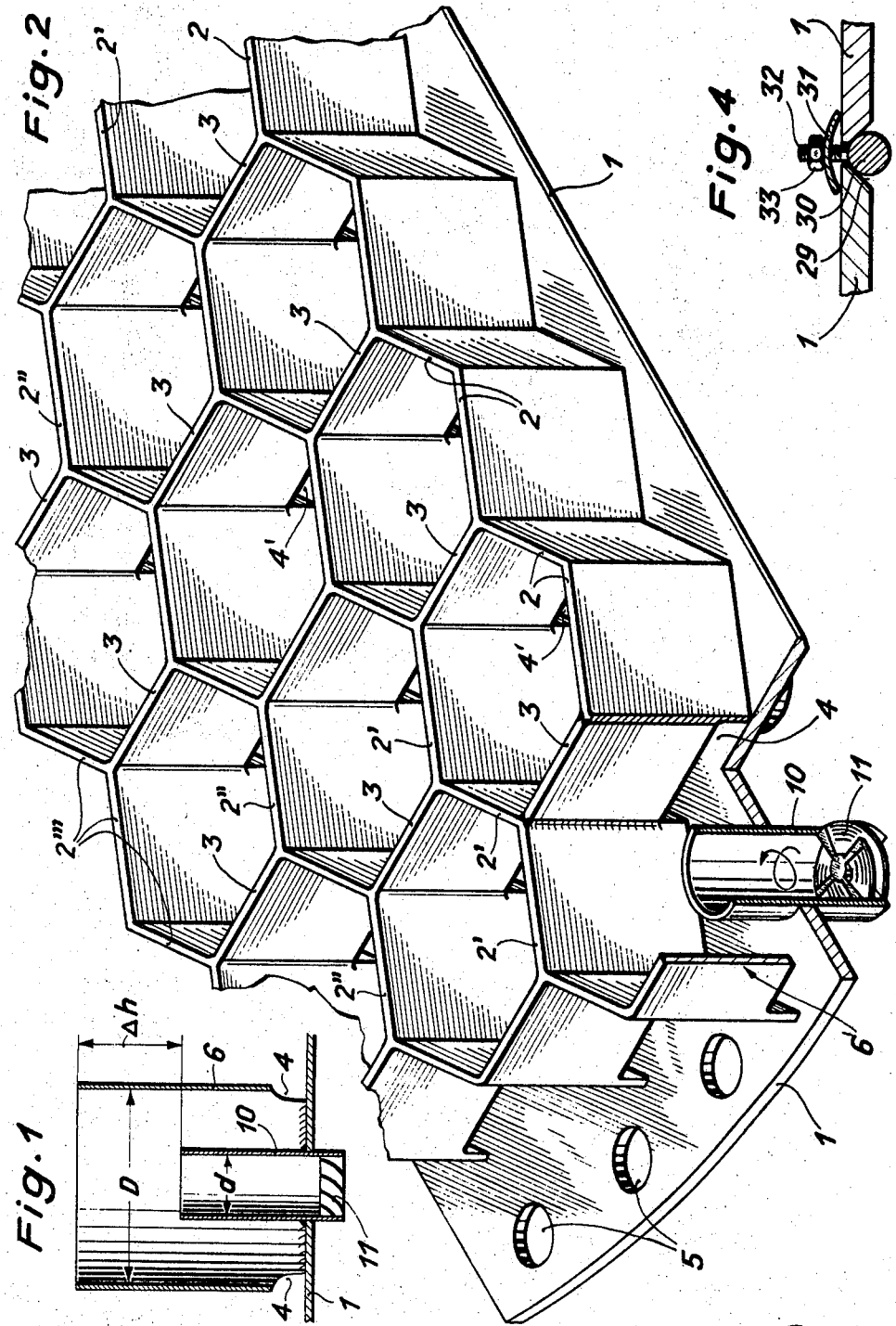

WATER SEPARATOR FOR SATURATED-STEAM GENERATORS

This invention relates to a water separator. More particularly, this invention relates to a water separator for saturated-steam generators. Still more particularly, this invention relates to a water separator for a saturated-steam generator of a nuclear reactor installation.

In installations having saturated-steam generators which supply generated steam to steam turbines in a saturated state, i.e. not superheated, the steam must be dried well mechanically. Heretofore, it has been known to direct the steam through twist-producing elements in order to force individual steam currents to turn so that the water droplets in the steam are flung out. However, the installations which have utilized these features have been complex in design and costly to manufacture and assemble. In addition, a relatively large space has been required for the separation of the water droplets from the generated steam.

Accordingly, it is an object of the invention to provide a water separator that is simple in construction.

It is another object of the invention to effectively separate water from steam with a slight pressure drop across a water separator.

It is another object of the invention to use a minimum of geometrically shaped parts in constructing a water separator.

It is another object of the invention to reduce the manufacturing and assembling costs of a water separator.

It is another object of the invention to provide a water separator of compact size to reduce the space taken up by the water separator.

Briefly, the invention provides a water separator which is to be mounted in a saturated-steam generator, for example, of a nuclear reactor installation, above a stem generating chamber. The water separator includes a perforated plate in which a plurality of circular-cylindrical tube sections are mounted for conveying flow mixtures of generated steam and water. In addition, a twist-producing element is mounted in the bottom end of each tube section so as to direct the flow mixtures into a swirling or twisting upward path. Also, a jacket is coaxially disposed around each tube section to receive the water flung out from the swirling mixture. Each jacket has an inside diameter which is at least 1.5 times the inside diameter of a surrounded tube section and extends above the tube section by a distance at least equal to the inside diameter of the tube section. Further, water outlets are provided between the bottoms of the jackets and the plate.

As a mixture of steam and water passes upwardly into a tube section, the mixture is first compelled to adopt a turning motion, as is known, in the twist-producing elements. Thereafter, the water droplets are flung onto the internal wall of the tube section during subsequent passage of the mixture through the tube section. Then, however, due to the tractive force of the steam, the water is dragged along the wall and flung outwardly from the top of the tube section against the interior walls of the surrounding jacket. The water then flows down the jacket walls out of the path of flow of the steam onto the plate for return via the water outlets between the jacket and plate to the water space of the generator. The dried out steam simultaneously flows upwardly out of an upper aperture in the generator to a turbine.

According to the invention, the twist-producing elements need only extend over a small limited height such that their design is greatly simplified. Also, apart from the simple twist-producing elements, in one embodiment of the invention, only two geometrically simple hollow cylindrical shapes need be used, i.e. a circular-cylindrical tube section and a coaxially surrounding jacket. This results overall in a simple construction for the water separator so that manufacturing and assembly costs are low.

In another embodiment of the invention the jackets are of hexagonal form and are connected to one another in honeycomb fashion. The jackets thus have regular hexagonal cross sections as well as common walls. This enables the water separator to be manufactured with a considerable saving in cost, particularly if the walls of the jackets consist of several zigzag-bent parallel sheet metal strips and of rectangular sheet metal pieces connecting the mutually opposite bent edges of the strips, and if the sheet metal strips are welded to the plate and each sheet metal piece is disposed short of the plate to form a water outlet. Welding the sheet metal strips onto the plate enables the plate to be well stiffened with the use of a relatively small amount of material, so that the plate is self-supporting and is able to resist without substantial deformation the pressure difference on both sides of the plate occurring during separation.

These and other objects and advantages of the invention will become apparent from the following detailed description and appended claims taken in conjunction with the accompanying drawings in which:

FIG. 1 illustrates a cross-sectional view of a circular tube element and a circular jacket of a water separator according to the invention;

FIG. 2 illustrates a perspective fragmentary view of a modified water separator of the invention;

FIG. 4 illustrates a partial cross-sectional view through the water separator of FIG. 3.

Figure 3:
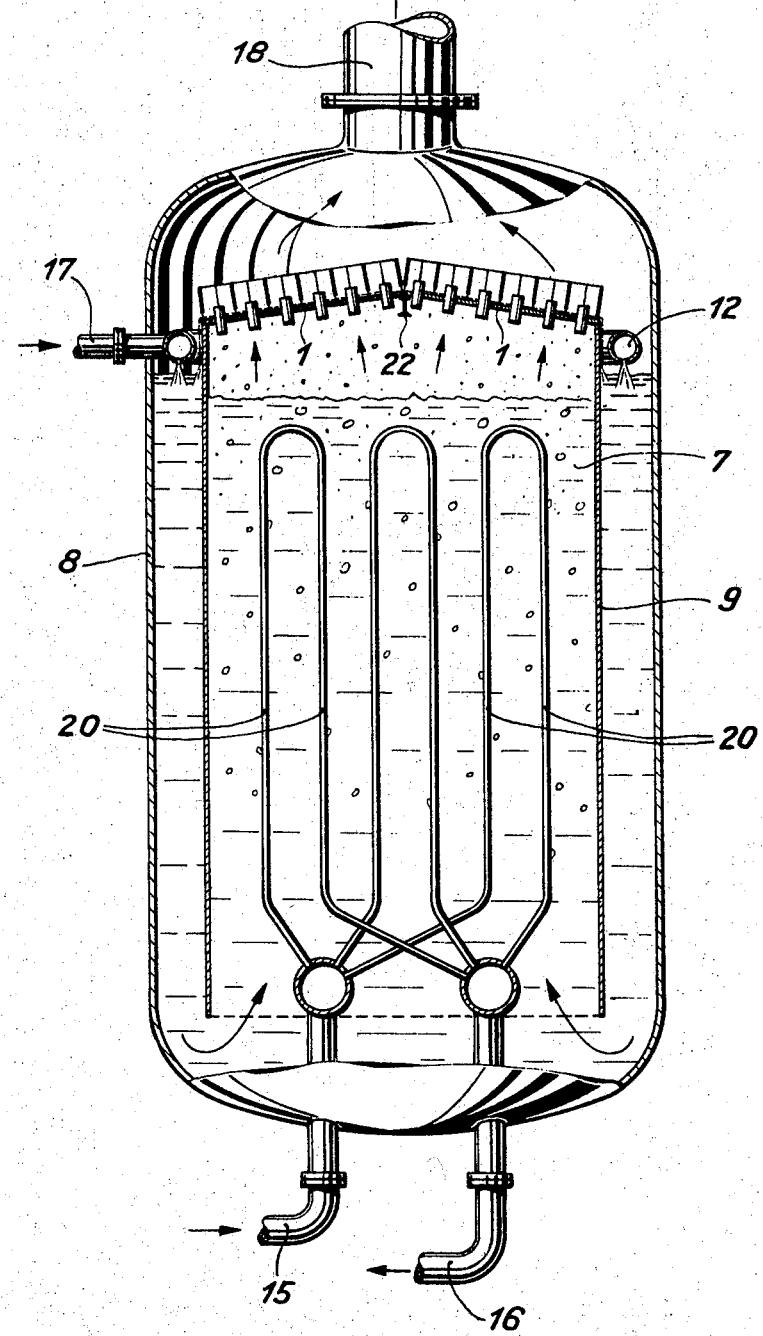
FIG. 3 illustrates a partial cross-sectional view of a saturated-steam generator having a water separator according to the invention mounted therein.

Referring to FIG. 1, a water separator is constructed of a plurality of separator elements (only one of which is shown for simplicity) mounted on a plate 1. Each separator element includes a tube section 10 secured within an aperture of the plate 1, a twist-producing element 11 in the bottom of each tube section, and a jacket 6 coaxially surrounding each tube section 6 and secured to the plate 1, as by welding. Both the tube section 10 and jacket 6 are of circular-cylindrical cross section. The jacket 6 has an inside diameter $D$ at least 1.5 times as large as the inside diameter $d$ of the tube section 10 and extends above the tube section 10 by a distance $\Delta h$ at least the inside diameter $d$ of the tube section 10. The bottom end of the jacket 6 is formed, as by cutting, with two apertures 4 in the jacket wall which cooperate with the plate 1 to form water outlets for the outward flow of separated water.

Alternatively, the jacket 6 can be secured to the tube section 10, as by radial arms, without having the bottom end of the jacket rest on the plate 1. In this case, the apertures 4 can be omitted since water can flow through the space between the base of the jacket 6 and the plate 1.

Referring to FIG. 2, the water separator can be modified from that described above. In this embodiment, the plate 1 has a plurality of holes 5 at the left-hand end, as shown, whereby the plate 1 is secured into a steam generator, as by screws. Also, the plate 1 has uniformly distributed apertures in each of which a tube section 10 of circular cross section is mounted. Each tube section 10 is open at the top and bottom and a twist-producing element 11, as above, is secured at the bottom. The twist-producing element 11 consists of a four-threaded, square-threaded screw with a very great depth of recess with each thread extending approximately over half the circumference of the tube section 10. The height of the tube section 10 is substantially more than that of the twist-producing element. In addition, each tube section 10 is surrounded by a jacket 6' of regular hexagonal cross section which extends above the tube section 10 by at least the inside diameter of the tube section 10. The inscribed circle of the jacket 6' is at least 1.5 times as large as the inside diameter of the tube section 10. The jackets 6' are interconnected in honeycomb fashion so that each pair of adjacent jackets has a common wall.

In order to produce the honeycomb structure of the jackets 6', for example, for three rows of tube sections 10 and twist-producing elements 11, four zigzag-bent sheet metal strips 2, 2', 2'', 2''' are secured as by welding to the plate 1 in parallel relation. Next, sheet metal pieces 3 are inserted between the strips 2–2''' at mutually opposite bent edges and connected to the strips as by welding. The height of these pieces 3 is slightly less than that of the strips so that apertures 4' can be formed between the pieces 3 and the plate 1 by securing the pieces 3 with the top surfaces flush with those of the sheet metal strips.

When the water separator is in operation, the evaporating water is situated below the plate 1, and the wet steam flows from below through the twist-producing elements 11 into the circular tube sections 10. On flowing through the elements 11 the wet steam is given a turning motion whereby the water droplets in the steam current are flung onto the wall of the tube section 10. Owing to the tractive force of the steam current, the liquid is drawn upwards along the walls of the tube sections 10 and flung at the top ends against the walls of the surrounding jackets 6'. The steam then flows onwards to the place of consumption, while the flung-out water flows downwards along the walls of the jackets 6' and accumulates on the plate 1, whence it then flows back to the water to be evaporated.

Referring to FIG. 3, a saturated-steam generator utilizing a plurality of water separators has the water separators disposed above the water 7 to be evaporated with the separators on diametrically opposite sides of the pressure vessel 8 of the generator inclined with respect to each other so as to facilitate the runoff of the separated water. The pressure vessel 8 houses a hollow cylinder 9 which is open at the bottom and top and a plurality of heat transmission tubes 20 within the cylinder 9. The heat transmission tubes 20 are supplied with a heat-emitting medium for heating the water 7 within the cylinder 9 through a duct 15 and are exhausted through a second duct 16. Also, a water feed duct 17 is connected to an annular duct 12 between the walls of the pressure vessel 8 and cylinder 9 near the upper end of the cylinder 9 for supplying the water to be evaporated. The annular duct 12 is provided with openings which serve to distribute the water uniformly into the annular space between the walls of the pressure vessel 8 and cylinder 9. A duct 18 is connected to the top of the pressure vessel 8 for leading the dried steam to a steam consumer, e.g. a turbine.

The plates 1 of the water separators extend across the top of the hollow cylinder 9 and are supported at one end on an I-beam 22 secured at the ends to the wall of the cylinder 9 and extending diametrically of the pressure vessel 8. The plates 1 allow the runoff from the jackets 6' to return to the annular space between the pressure vessel 8 and cylinder 9 for recycling.

Referring to FIG. 4, several plates 1 are disposed in side-by-side relation across the cylinder 9 perpendicularly of the I-beam 22 and sealing means are provided in order to seal the gap between each pair of adjacent plates. The sealing means includes a rod 30 of round cross section which is received in a groove 29 formed by beveling the adjacent edges of the plates 1 on the bottom. A number of screw bolts 32 are distributed along the length of the rod 30 which project between the plates 1 and which are each provided with nuts 33 above the plate 1. In addition, a spring 31 is mounted on each screw bolt 32 between a nut 33 and the plates 1 in order to hold the rod 30 resiliently in the groove 29 against the plates 1. Upon tightening of the nut 33, the spring 31 is flattened while the rod 29 is brought up against the plates 1.

I claim:

1. A water separator for a saturated-steam generator comprising:
   a plate;
   a plurality of circular-cylindrical tube sections disposed in said plate for conveying a mixture of steam and water flows therethrough;
   a twist-producing element mounted in the bottom of each tube section for directing the flow therethrough into a twisting path;
   a jacket coaxially surrounding each tube section, said jacket having an inside diameter at least 1.5 times the inside diameter of said surrounded tube section and extending above said tube section a distance at least equal to said inside diameter of said tube section; and
   at least one water outlet disposed between the bottom of each jacket and said plate.

2. A water separator as set forth in claim 1 wherein each jacket is secured on said plate and each water outlet is formed in a cutaway portion of the bottom of each jacket.

3. A water separator as set forth in claim 1 wherein each jacket is hexagonal in cross section and is connected to an adjacent jacket.

4. A water separator as set forth in claim 1 wherein each jacket is of regular hexagonal cross section and is connected to an adjacent jacket in honeycomb fashion to have a common wall therebetween.

5. A water separator as set forth in claim 4 wherein a plurality of zigzag-bent parallel strips are secured to said plate and a plurality of rectangular pieces are secured between mutually opposite bent edges of said strips to form a plurality of said jackets, each said piece being spaced above said plate to form said water outlet.

6. A water separator as set forth in claim 5 wherein said strips and said pieces are of sheet metal.

7. A water separator as set forth in claim 1 wherein said plate is formed of a plurality of strips.